United States Patent [19]

Goldinger

[11] 4,204,445
[45] May 27, 1980

[54] SCORING DEVICE HAVING A REFERENCING CARRIAGE

[75] Inventor: John A. Goldinger, Boiling Springs, Pa.

[73] Assignee: PPG Industries, Inc., Pittsburgh, Pa.

[21] Appl. No.: 945,934

[22] Filed: Sep. 26, 1978

Related U.S. Application Data

[62] Division of Ser. No. 801,712, May 31, 1977, Pat. No. 4,137,803.

[51] Int. Cl.² .............................................. B26D 3/08
[52] U.S. Cl. ..................................... 83/880; 83/881; 83/886
[58] Field of Search ................................. 83/880–886

[56] References Cited
U.S. PATENT DOCUMENTS

| 1,167,254 | 1/1916 | Denson . | |
| 2,948,991 | 8/1960 | Walters et al. | 225/96.5 |
| 3,240,090 | 3/1966 | Bognar | 83/880 |
| 3,280,067 | 10/1966 | Grzymislawski . | |
| 3,280,677 | 10/1966 | Grzymislawski . | |
| 3,399,586 | 9/1968 | Insolio et al. | 83/881 |
| 3,518,907 | 7/1970 | Pinel | 83/886 |
| 3,577,636 | 7/1970 | Pinel . | |
| 3,807,261 | 4/1974 | Couvreur . | |
| 4,070,936 | 1/1978 | Duncan | 83/861 |

Primary Examiner—Meister J. M.
Attorney, Agent, or Firm—Donald Carl Lepiane

[57] ABSTRACT

A glass scoring device includes a scoring head assembly and a carriage each pivotally mounted about an axis. The carriage has a pair of spaced wheels biased toward a glass ribbon and a support member. The support member biases a cutting force against the scoring head assembly to score a glass ribbon. Irregularities in the glass ribbon thickness and/or eccentric conveyor rolls oscillates the carriage and scoring head assembly about the axis. Oscillatory movement of the carriage scoring head assembly cooperate to maintain a constant cutting force on the scoring head assembly.

6 Claims, 13 Drawing Figures

SCORING DEVICE HAVING A REFERENCING CARRIAGE

This is a division of application Ser. No. 801,712, filed May 31, 1977, now U.S. Pat. No. 4,137,803, granted Feb. 6, 1979.

BACKGROUND OF THE INVENTION

1. Field of the Invention

This invention relates to a scoring device and more particularly to a scoring device having a referencing carriage to maintain a constant predetermined scoring force or scoring load on a scoring wheel.

2. Discussion of the Prior Art and Technical Problems

In the prior art, there is taught the use of spiraled, coiled springs for applying a load or force on a scoring wheel. Such teachings are found in U.S. Pat. Nos. 1,167,254; 3,240,090; 3,280,676; 3,280,677; 3,577,636; and 3,807,261 to name a few.

Although the use of spiraled, coiled springs for applying a scoring force on a scoring wheel is acceptable, there are drawbacks. For example, coiled and tension springs are adjusted to apply a predetermined force on the scoring wheel to score a glass ribbon. As the glass ribbon advances along a conveyor past the scoring wheel, the scoring wheel pivots toward and away from the conveyor. The movement of the scoring wheel may be the result of eccentric conveyor rolls that advance the glass ribbon or variations in glass thickness. When the scoring wheel moves away from the conveyor, coiled springs compress and tension springs expand thereby increasing the scoring force acting on the scoring wheel. Further, when the scoring wheel moves toward the conveyor, coiled springs expand and tension springs compress to decrease the scoring force acting on the scoring wheel.

In the scoring of glass sheets, in particular glass sheets having a thickness of less than about ⅛ inch (0.32 centimeter), variations in the scoring force give inconsistent scores. For example, if the force acting on the scoring wheel is too high, e.g., above about 10 pounds (4.5 kilograms), the glass surface may be crushed at the score line. Conversely, if the scoring force acting on the scoring wheel is too low, e.g., below about 3 pounds (1.35 kilograms), the score is too shallow.

U.S. patent application Ser. No. 669,560 filed on Mar. 23, 1976, in the name of R. M. Bonaddio for a "Force Applying Device for Scoring Wheels" eliminates the above drawbacks of the prior art. As taught in the above-mentioned U.S. patent application, a constant force coil spring biases an end of a lever arm. A scoring wheel mounted on the other end of the lever arm is thereby urged against a piece of glass.

The scoring device taught in U.S. patent application Ser. No. 669,560 is suitable to eliminate force variations applied to a scoring wheel. It would be advantageous to have still another type of scoring device that has facilities for maintaining a constant, predetermined load on the scoring wheel during scoring of a glass ribbon.

SUMMARY OF THE INVENTION

This invention relates to a scoring head having scoring facilities and a carriage pivotally mounted for movement through a reciprocating arcuate path. Biasing facilities acted on by the carriage and acting on the scoring facilities urge the scoring facilities in the first direction along its reciprocating arcuate path.

This invention also relates to a method of scoring a sheet of refractory material. The sheet is advanced along a predetermined path as a predetermined force is applied to scoring facilities. The scoring facilities are oscillated toward and away from the predetermined path while the sheet is scored and the predetermined force is maintained on the scoring facilities.

DESCRIPTION OF THE INVENTION

Figure 1:
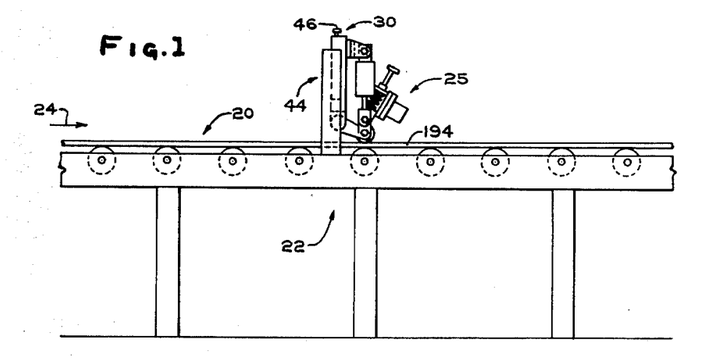
FIG. 1 is a side view of a scoring station for scoring a glass ribbon having scoring devices incorporating features of the invention.
Figure 2:
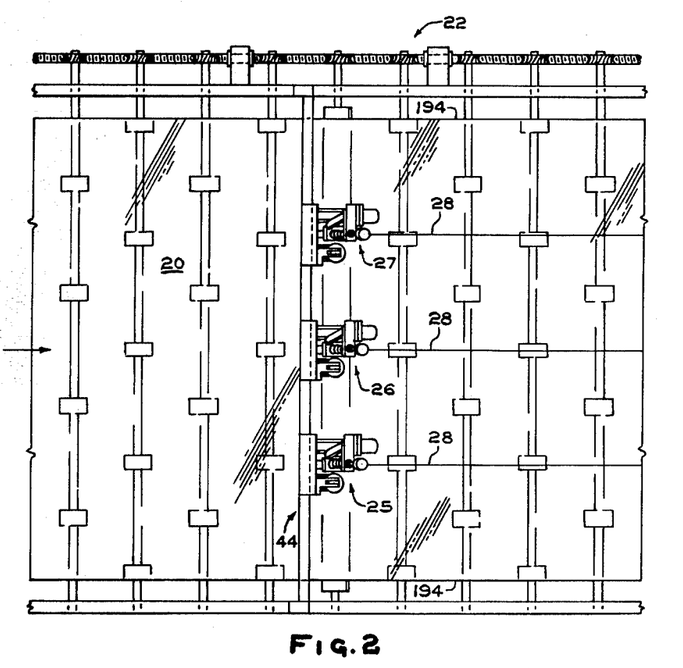
FIG. 2 is a plan view of the scoring station shown in FIG. 1.

With reference to FIGS. 1 and 2, a glass sheet or glass ribbon 20 is advanced by conveyor 22 in the direction of arrow 24 past a plurality of scoring devices 25, 26 and 27 incorporating features of the invention. Each of the scoring devices 25–27 imposes a score line 28 in the glass sheet 20 in a manner to be discussed below.

The conveyor 22 may be any of the types used in the glass scoring art and is not limiting to the invention.

The scoring devices 25–27 are identical in construction and the discussion directed to the scoring device 27 is applicable to the scoring devices 25 and 26 unless indicated otherwise.

Figure 3:
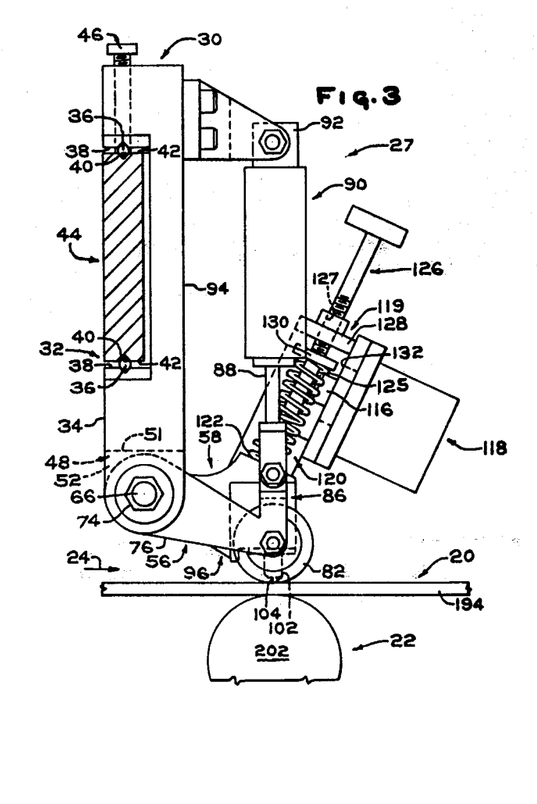
FIG. 3 is a side view of a scoring device incorporating features of the invention.

As shown in FIG. 3, the scoring device 27 includes a plate member 30 having a guideway 32 formed in back surface 34. Ball bearings 36 are mounted in opposed sides 38 of the guideway 32 and ride in raceway 40 formed on opposed surfaces 42 of lateral structural member 44. In this manner, the scoring devices 25–27 may be moved along the lateral structural member 44 into a predetermined position over the conveyor 22. The scoring devices 25–27 are locked in position by a locking pin 46 which passes through the plate member 30 into engagement with the lateral structural member 44 as shown in FIG. 3.

As will be appreciated, the invention is not limited to the manner of securing the scoring devices 25–27 in position over the conveyor 22 and any locking arrangements known in the art may be used in the practice of the invention.

Figure 4:
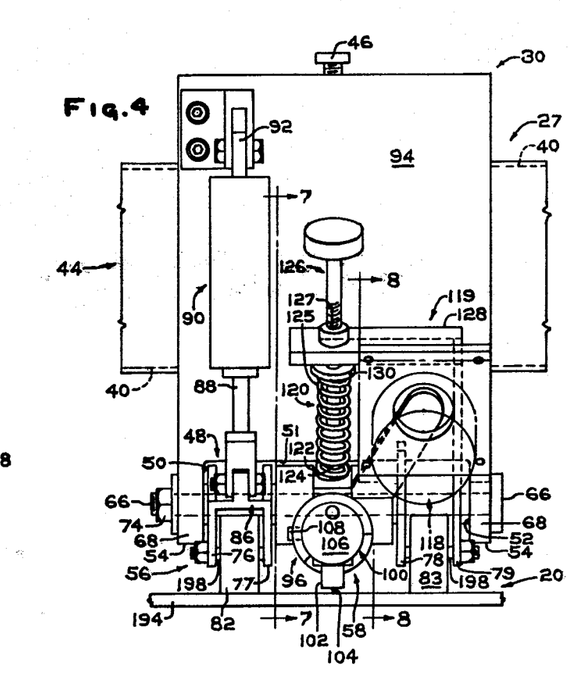
FIG. 4 is a frontal view of the scoring device shown in FIG. 3.

Plate member 30 as shown in FIG. 4 has channel 48 defined by sides 50, 51 and 52 formed in bottom end 54. Carriage 56 shown in FIG. 5 and scoring head assembly 58 shown in FIG. 6 are mounted in the channel 48 in a manner discussed below.

Figure 5:
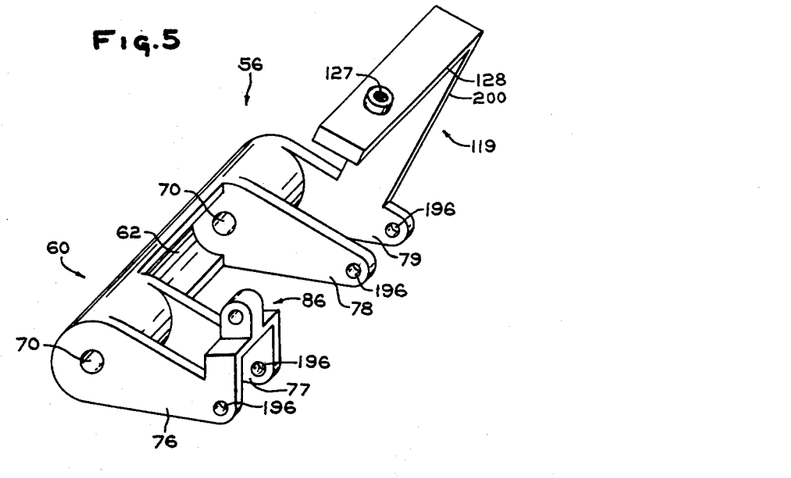
FIG. 5 is an isometric view of the referencing carriage of the scoring device of FIGS. 3 and 4.
Figure 6:
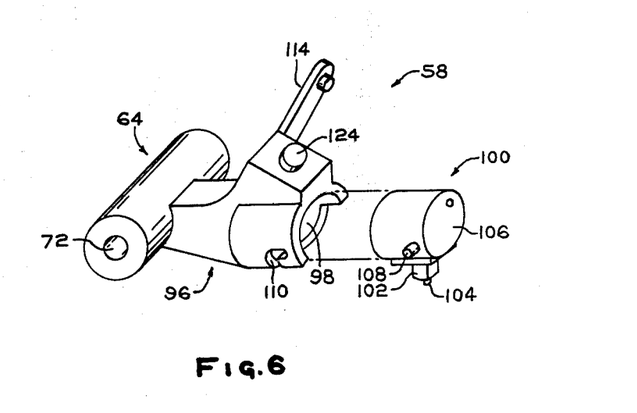
FIG. 6 is an isometric view of the scoring head assembly of the scoring device of FIGS. 3 and 4.

The carriage 56 as shown in FIG. 5 includes a cylindrical member 60 having a cut out portion 62 for receiving cylindrical body 64 of the scoring head assembly 58 shown in FIG. 6. The carriage 56 and scoring head assembly 58 are rotatably mounted in the channel 48 by a bolt 66 passing through legs 68 of the channel 48 (see FIG. 4), hole 70 in the carriage 56 (see FIG. 5) and passageway 72 of the scoring head assembly 58 (see FIG. 6). The bolt 66 is secured in position by nut 74. In this manner the carriage 56 and score head assembly 58 oscillate toward and away from the conveyor 22 or rotate about an axis.

With reference to FIGS. 4 and 5, a plurality of plates 76-79 extend from the cylindrical member 60 of the carriage 56. A wheel 82 is rotatably mounted between the plates 76 and 77 and a wheel 83 is rotatably mounted between the plates 78 and 79. The wheels 82 and 83 ride on the glass 20 when the carriage 56 is in the engaging position.

A yoke 86 mounted on the plate 76 and 77 is advantageously connected to piston rod 88 of air cylinder 90. As shown in FIGS. 3 and 4, end 92 of the air cylinder 90 is advantageously mounted to surface 94 of the plate member 30. Withdrawing the piston 88 into the air cylinder 90 raises the carriage 56 away from the glass 20 into a non-engaging position and extending the piston rod 88 out of the air cylinder 90 moves the carriage 56 into the engaging position with the wheels 82 and 83 riding on the glass 20.

With reference to FIG. 6, an elongated member 96 is secured to the cylindrical body 64 of the scoring head assembly 58. The member 96 has a hollowed end portion 98 for receiving scoring wheel assembly 100.

Figure 7:
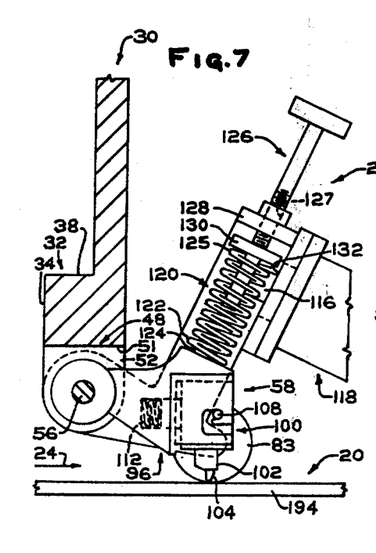
FIG. 7 is a view taken along lines 7—7 of FIG. 4.

The scoring wheel assembly 100 includes a stem 102 and scoring wheel 104 of the type used in the art to score glass secured to a cylindrical body 106. The cylindrical body 106 is inserted into the hollowed end portion 98 of the member 96 with tab 108 insertable in groove 110 formed in the hollow end portion 98. With reference to FIG. 7, a spring 112 is mounted in the elongated member 96 and biases the cylindrical body 106 to the right as shown in FIG. 7 to maintain the tab 108 in the groove 110.

Figure 8:
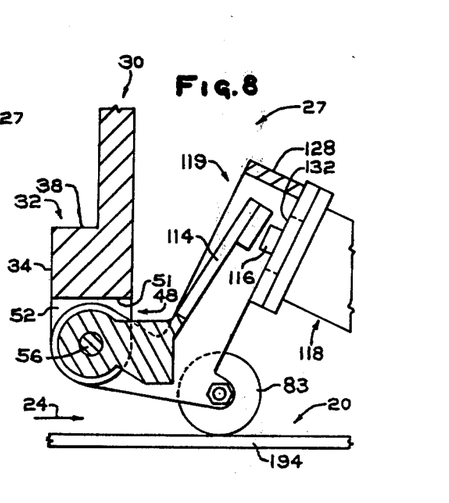
FIG. 8 is a view taken along lines 8—8 of FIG. 4.
Figure 9:
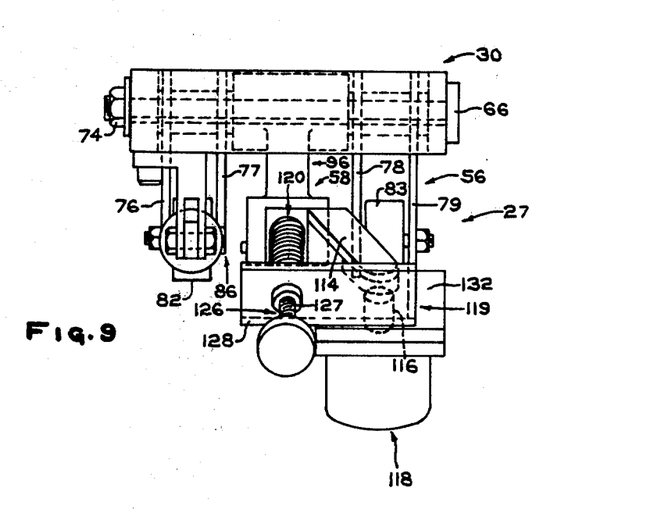
FIG. 9 is a top view of the scoring device shown in FIGS. 3 and 4.

Referring to FIGS. 6, 8 and 9, an arm 114 is secured to the elongated member 96 and extends upward therefrom into the path of plunger 116 of solenoid 118. The solenoid 118 is mounted on support arm 119 secured to plate 79 of the carriage 56 as shown in FIG. 5.

Referring now to FIGS. 3, 4, 7 or 9, a helical spring 120 has end 122 mounted on disc 124 (clearly shown in FIG. 6) of the elongated member 96 of the scoring head assembly 58. The other end 125 of the spring 120 is acted on by a threaded shaft 126 threaded through hole 127 in leg 128 of the support arm 119 of the carriage 56. Rotating the threaded shaft 126 in the first direction moves collar 130 mounted on the shaft against spring end 125 to compress the spring 120. Compressing the spring 120 biases the scoring head assembly under a force or load toward the conveyor 20. Rotating the threaded shaft 126 in the opposite direction decreases the biasing force of the spring 120 acting on the scoring head assembly 58. The downward motion of the scoring head assembly 58 is limited by the arm 114 of the scoring head assembly 56 engaging surface 132 of the solenoid 118 or by engaging the glass 24 when the scoring head assembly 56 is in the engaging position.

The scoring head assembly 56 is moved away from the conveyor 20 to the non-engaging position by energizing the solenoid 118 to move the plunger 116 out of the solenoid 118. As the plunger 116 moves out of the solenoid 118, it engages the arm 114 and urges the scoring head assembly 58 away from the conveyor 20 against the biasing action of the spring 120.

In practice, the piston rod 88 of the cylinder 90 is withdrawn into the cylinder 90. In this position, the carriage 56 is raised above the conveyor 22 by the air cylinder 90. The plunger 116 of the solenoid 118 is in the extended position urging the arm 114 of the scoring head assembly 58 to the left as viewed in FIG. 7 against the biasing action of the spring 120. Moving the arm 114 to the left pivots the scoring arm assembly 58 counterclockwise as viewed in FIG. 7 to raise the scoring wheel above the plane of the wheels 82 and 83 of the carriage 56. The carriage 56 and score wheel assembly 58 are in the non-engaging position.

With continued reference to FIG. 7, the threaded shaft 126 is rotated in a first direction to compress the spring 120 and apply a predetermined scoring force or scoring load on the scoring head assembly 58.

As glass sheet or glass ribbon 20 advances past the scoring devices 25-27, the piston 88 of the cylinder 90 is moved outward to move the wheels 82 and 83 of the carriage 56 against the glass sheet 20. The carriage 56 is now in the engaging position and the scoring head assembly 56 is still in the non-engaging position, i.e., the scoring wheel 104 is raised above the glass 20.

To score the glass sheet 20, the solenoid 118 is deactivated. The plunger 116 of the solenoid 118 is moved into the solenoid 118 by the biasing action of the spring 120 which urges the scoring head assembly 56 downward as viewed in FIG. 3. The downward motion of the scoring head assembly 56 is stopped by the scoring wheel 104 engaging the glass sheet 20. The scoring head assembly 58 is now in the engaging position to score the moving glass sheet 20.

As the carriage 56 is pivoted in a counterclockwise or clockwise direction as viewed in FIG. 3, by variation in glass thickness or conveyor roll eccentricity, the scoring wheel assembly 58 similarly moves. Simultaneously pivoting the carriage 56 and scoring wheel assembly 58 the same distance in the same direction maintains a constant scoring force on the scoring head assembly 58. This is because the distance between the support arm leg 128 and scoring head assembly 58 remains constant during the movement of the carriage 56 and scoring head assembly 58. Therefore the length of the spring 120 and biasing action of the spring remains constant.

In the practice of the invention, it is recommended that the force of the cylinder 90 acting on the carriage 56 be greater than the force of the spring 120 acting on the scoring head assembly 58. In this manner the force due to variations in glass thickness and/or conveyor roll eccentricity is sufficient to pivot the carriage 56 and the scoring head assembly 58.

Further it is recommended that the rotating axis of the carriage wheels 82 and 83 and rotating axis of the scoring wheel 104 lay in a plane normal to the movement path 24. In this manner, the resultant force due to glass thickness variations and/or conveyor roll eccentricity acting on the carriage 56 and scoring head assembly 58 is the same.

As can now be appreciated, the scoring device of the instant invention may be used to score refractory material other than glass such as ceramics, e.g., MONOFRAX ® ceramics sold by the Carborundum Corporation and glass-ceramics, e.g., HERCUVIT ® glass-ceramics sold by PPG Industries, Inc.

Figure 10:
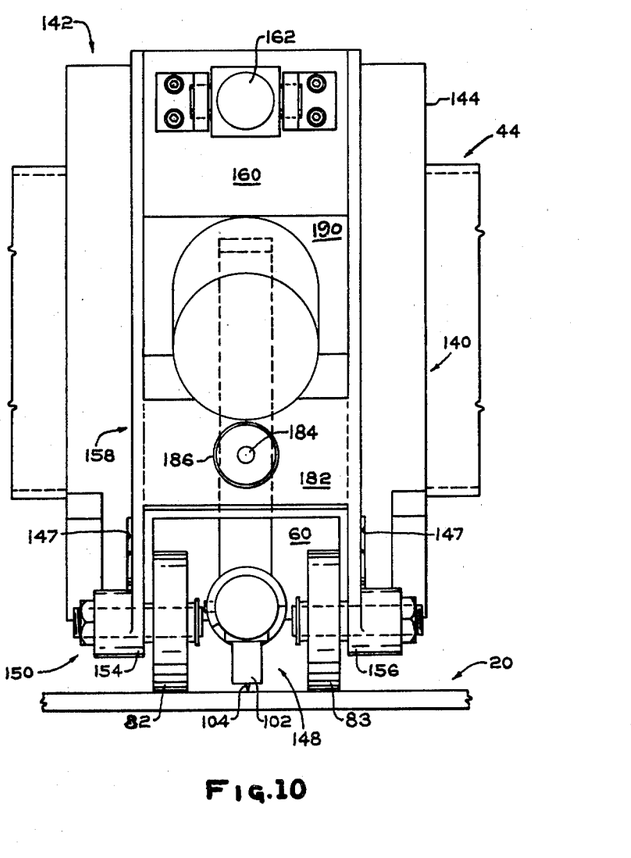
FIG. 10 is a frontal view of an alternate embodiment of a scoring device incorporating features of the invention.
Figure 11:
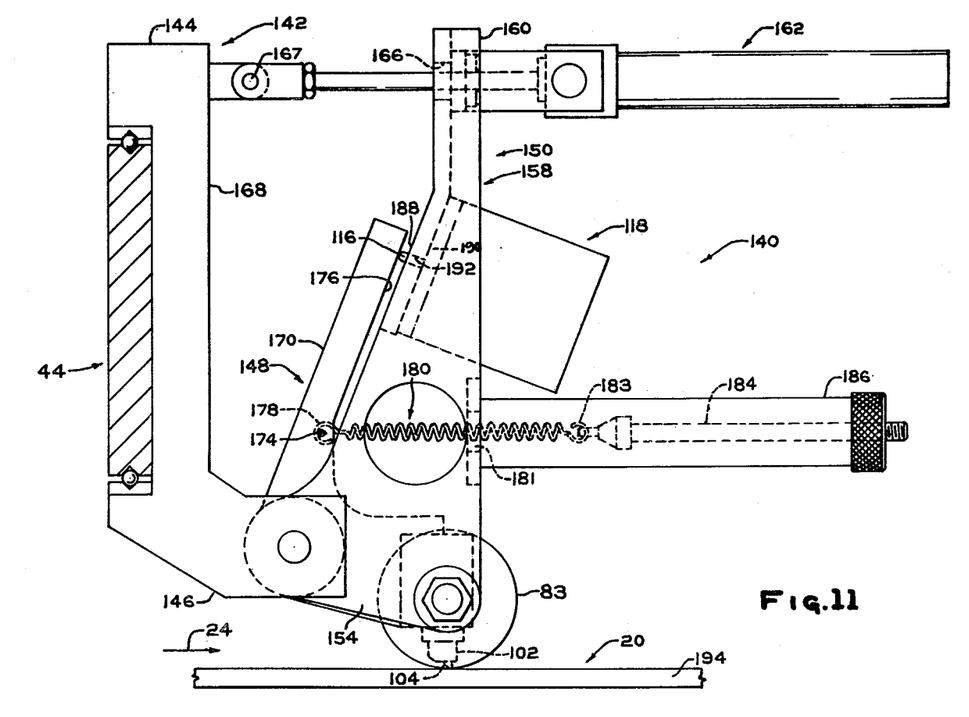
FIG. 11 is a side view of the scoring device shown in FIG. 10.
Figure 12:
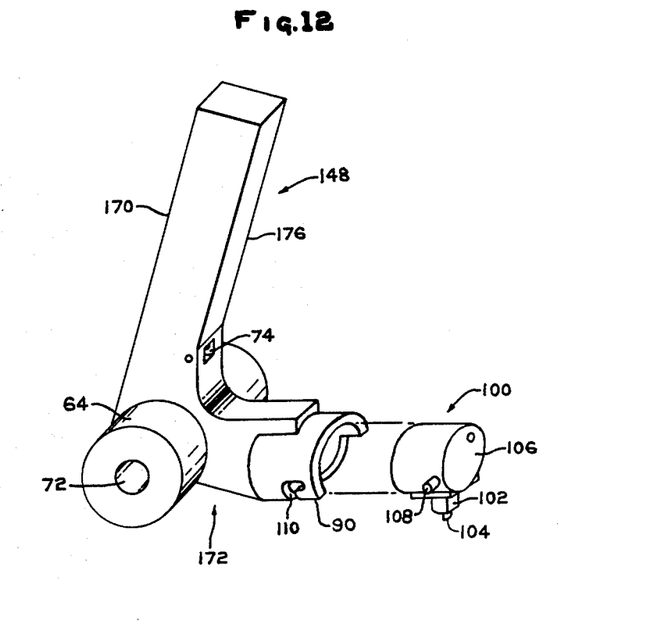
FIG. 12 is an isometric view of the scoring head assembly of the scoring device shown in FIG. 10.

Shown in FIGS. 10 and 11 is an alternate embodiment of a scoring device incorporating features of the invention. Scoring device 140 has a generally L-shaped plate member 142 having a vertical leg 144 for mounting the plate member 142 on the lateral strut member 44 in a similar manner as the plate member 30 of scoring devices 25-27. The horizontal leg 146 of the plate member 142 has a channel 147 formed therein for pivotally mounting scoring head assembly 148 (see FIG. 12) and carriage 150 (see FIG. 13) in a similar manner as the carriage 56 and scoring head assembly 58 are pivotally mounted in the channel 48 of the plate member 30 as shown in FIG. 4.

Figure 13:
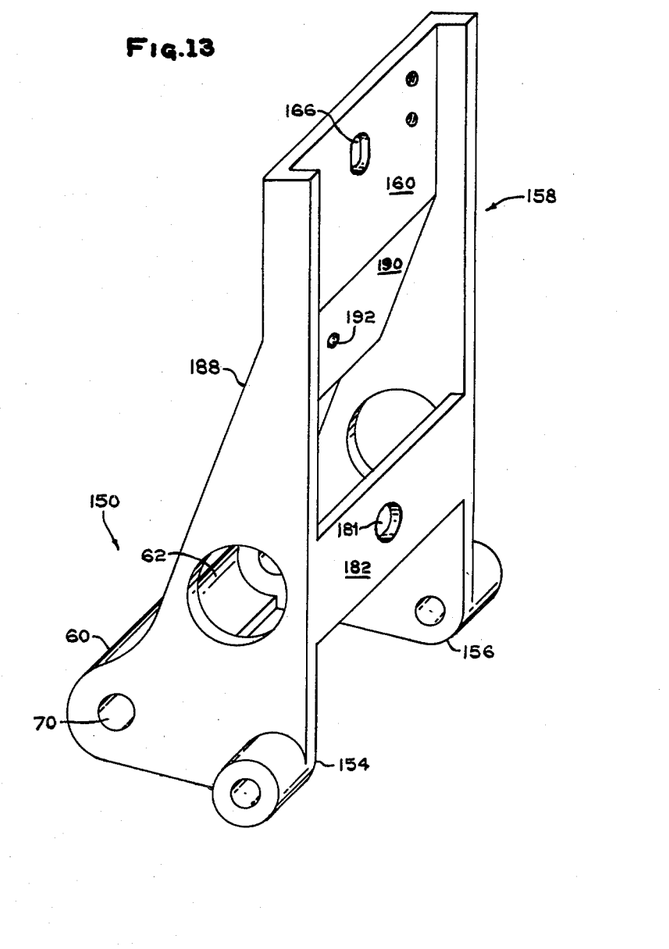
FIG. 13 is an isometric view of the referencing carriage of the scoring device shown in FIG. 10.

With reference to FIG. 13, the carriage 150 includes the cylindrical body 60 having the cut out portion 62 for receiving the cylindrical body 64 of the scoring head assembly 148 shown in FIG. 13. A pair of spaced plates 154 and 156 extend from the cylindrical body 60 for rotatably mounting wheels 82 and 83 and having an upright member 158 advantageously mounted thereto as shown in FIG. 11. The upright member 158 has a surface 160 for mounting air cylinder 162. Piston 164 of the air cylinder 162 extends through hole 166 in the surface 160 and is pivotally mounted at 167 to surface 168 of the plate member 142 as shown in FIG. 11. Moving the piston 164 into the air cylinder 162 pivots the carriage 152 in a counterclockwise direction as shown in FIG. 11 away from the glass sheet 20 and vice versa.

The scoring head assembly 148 has a vertical arm 170 and an elongated member 172 secured to the cylindrical body 64 as shown in FIG. 13. The elongated body 172 has the cut out portion 98 for receiving the scoring wheel assembly 100 as previously discussed. With specific reference to FIG. 11, the vertical arm 170 has a cavity 174 on surface 176 for securing end 178 of spring 180. The spring 180 passes through hole 181 in surface 182 of the upright 158 shown in FIG. 13 and has its other end 183 secured to end of thread rod 184 extending out of housing 186. The housing 186 is advantageously mounted to the surface 182 of the upright member 158 of the carriage 152. The spring 180 biases the scoring head assembly 148 in a clockwise direction as viewed in FIG. 11. Rotating the threaded rod in a first direction displaces the threaded shaft out of the housing to increase the biasing force of the spring 180 and vice versa.

The movement of the scoring head assembly 148 in a clockwise direction as viewed in FIG. 11 is limited by the abutment member 188 of the upright 158 of the carriage 150.

The solenoid 118 is mounted on surface 190 of the abutment member 188 shown in FIG. 13 and has its piston 116 extending through hole 192 as shown in FIG. 11. The solenoid 118 and its piston 116 moves the scoring head assembly 148 from the engaging position to the non-engaging position in a similar manner as the scoring head assembly 58 shown in FIG. 6 is moved from the engaging position to the non-engaging position.

As can now be appreciated, other variations may be made to the invention without deviating from the scope thereof.

DETAILED DESCRIPTION OF THE INVENTION

With reference to FIGS. 1 and 2, scoring devices 25-27 of the invention are used to score a glass ribbon 20 having a width of about 14 feet (7.2 meters) as measured between sides 194 and a thickness of about ⅛ inch (0.32 centimeter).

The scoring devices 25-27 are identical in construction and the following discussion direction to the scoring device 27 is applicable to scoring devices 25 and 26 unless otherwise indicated.

With reference to FIGS. 3 and 4, the scoring device 27 includes an aluminum plate member 30 having a length of about 8 inches (20.3 centimeters); a width of about 5.25 inches (13.3 centimeters); and a thickness of about 1.375 inch (3.49 centimeters). A guideway 32 formed in back surface 34 of the plate member 30 has ball bearings 36 for slideably mounting the scoring device 27 on lateral structural member 44.

The lateral structural member 44 is mounted above conveyor 22 as shown in FIGS. 1 and 2 in any conventional manner. The conveyor 22 is of the type used in the art for advancing a glass ribbon, e.g., from an annealing lehr (not shown) through subsequent processing stations.

The bottom end 54 of the plate member 30 has a channel 48 defined by sides 50-52 for receiving carriage 56 shown in FIG. 5. The channel 48 has a length of about 4.5 inches (11.43 centimeters) as measured between sides 50 and 52 and a depth of about 1.375 inch (3.49 centimeters). With specific reference to FIG. 5, the carriage 56 includes a cylindrical member 60 having an outside diameter of about 1.375 inch (3.49 centimeters) and a length of about 4.25 inches (10.79 centimeters).

A plate 76 and 79 are each mounted on opposed ends of the cylinder 60 and a plate 77 and 78 are secured to the cylinder 60 with the plate 77 spaced about 0.875 inch (2.2 centimeters) from the plate 76 and the plate 78 spaced about 0.875 inch (2.2 centimeters) from the plate 79. Axially disposed hole 70 passes through the plates 76-79 for securing the carriage 56 in the channel 48 for pivotal motion in a manner to be discussed below.

Each of the plates 76-79 has a generally triangular shape having a hole 196 at their free end. The hole 196 of each plate 76-79 is on a center-to-center spacing of about 2.3125 inches (5.9 centimeters) with the axially disposed hole 70. A nylon wheel 82 having a diameter of about 1.375 inch (3.49 centimeters) and a thickness of about 0.625 inch (1.58 centimeter) is rotatably mounted between the plates 76 and 77 by a shaft 198 as shown in FIG. 4. A nylon wheel 83 similar to the wheel 82 is rotatably mounted in a similar manner between the plates 78 and 79.

The cylindrical member 60 between plates 77 and 78 has a cut out portion 62 having a length of about 2 inches (5.08 centimeters) and an arc of 180° for receiving cylindrical body 64 of scoring head assembly 58 shown in FIG. 6.

With specific reference to FIG. 6, the cylindrical body 64 has an outside diameter of about 1.0625 inch (2.7 centimeters) and a length of about 1.875 inch (4.76 centimeters). A passageway 72 is axially disposed in the cylindrical body 64 to secure the lever arm 58 in the cut out portion 62 of the carriage cylindrical member 60 in a manner discussed below.

An elongated member 96 having a length of about 2.5625 inches (6.51 centimeters) has one end secured to the cylindrical body 64 of the scoring head assembly 58 centrally disposed between the ends thereof. The other end of the elongated member 96 has a circular cut out portion 98 having a radius of about 0.5625 inch (1.43 centimeter) and a wall thickness of about 0.25 inch (0.64 centimeter) for receiving scoring wheel assembly 100. The scoring wheel assembly 100 includes a cylindrical body 106 having a diameter of about 0.5625 inch (1.43 centimeter) and a length of about 0.875 inch (2.2 centimeters). A stem 102 of the type used in the scoring art is secured to the cylindrical body and has a rotatably mounted scoring wheel 104. The scoring wheel 104 has a diameter of about 0.22 inch (0.56 centimeter); a thickness of about 0.05 inch (0.13 centimeter) and a scoring angle of about 137°.

With reference to FIG. 7, the scoring wheel assembly 100 is secured in the end 98 of the member 96 by inserting tab 108 mounted on the cylindrical body 106 in an L-shaped groove 110 mounted in the wall of the cut out portion 98. A spring 112 is seated in the elongated member and compressed by the cylindrical body 100 as the tab 108 is seated in the groove 110. The biasing action of the spring secures the score wheel assembly in position.

With reference to FIGS. 4–6, the cylindrical body 64 of the scoring head assembly 58 is mounted in the cut out portion 62 of the carriage 56. The carriage 56 is positioned in the channel 48 of the plate member 30 to receive a bolt 66 passing through the side 52 of the channel, hole 70 and 72 of the carriage, and scoring head assembly respectively and out of the channel side 68. A nut 74 secures the bolt 66 in position.

With specific reference to FIGS. 3 and 4, an air cylinder 90 has one end 92 pivotally mounted to front surface 94 of the plate member 30. The piston 88 of the cylinder 90 is pivotally mounted to yoke 86 mounted on the plates 76 and 77 (see also FIG. 5). Drawing the piston 88 into the cylinder 90 pivots the carriage away from the conveyor 20 to a non-engaging position and extending the piston 88 out of the cylinder moves the carriage toward the conveyor 22 to an engaging position.

Referring now to FIG. 5, an L-shaped arm 119 is mounted on the plate 79 of the carriage 56. The L-shaped arm has a width of about 1 inch (2.54 centimeters) and a thickness of about 0.125 inch (0.32 centimeter). The vertical arm 198 secured to the plate 79 has a length of about 3 inches (7.62 centimeters) and the horizontal arm 128 has a length of about 2.625 inches (6.67 centimeters). With reference to FIGS. 7 and 8, a solenoid 118 is mounted on the L-shaped arm 119 in any conventional manner. Piston 116 of the solenoid 118 extends beyond the surface of the solenoid 118 about 0.5625 inch (1.43 centimeter).

As shown in FIG. 6, an arm 114 extends from the elongated member and is angled to be engaged by the piston 116 of the solenoid 118 when the carriage and lever arm are assembled.

With reference to FIG. 7, a helical spring 120 having a length of about 2 inches (5.08 centimeters) and an inside diameter of about 0.59 inch (1.5 centimeter) has one end 122 mounted on disc 124 of the scoring head assembly 58 and the other end 125 engaging collar 130 of a threaded shaft 126. The threaded shaft 126 passes through internally threaded hole 127 on horizontal leg 128 of the carriage support arm 119 and extends into the spring 120 as shown in FIG. 7. Rotating the threaded shaft 126 in a first direction urges the collar 130 against the spring to compress same while applying a scoring force or scoring load to the scoring head assembly 58. Clockwise motion of the scoring head assembly as shown in FIG. 7 is limited by the arm 114 engaging surface 132 of the solenoid 118 when the solenoid 118 is deactivated. The solenoid 118 is activated to position the scoring arm in a non-engaging position and the piston 88 of the cylinder 90 is withdrawn to position the carriage 56 in a non-engaging position.

The scoring devices 25–27 are moved on the structural member 44 and positioned on a center-to-center spacing of about 6 feet (1.8 meter). The devices 25–27 are secured in position by locking pin 46 shown in FIG. 3. The threaded shaft 126 is rotated to apply a scoring force of about 8 pounds (3.6 kilograms) on the scoring head assembly 56 of each scoring device 25–27.

As the glass ribbon advances under the scoring devices, the cylinder 90 is activated to pivot the carriage in a clockwise direction as viewed in FIG. 3 to move the wheels 82 and 83 into engagement with the glass ribbon 20. The piston 12 applies a force of about 10 pounds (4.54 kilograms) to the carriage 56. The solenoid 118 is deactivated in any conventional manner and the piston 116 is moved into the solenoid 118 as the scoring head assembly 58 moves in clockwise direction as viewed in FIG. 3 under the biasing action of the spring 120. As the scoring head assembly moves in a clockwise direction, the scoring wheel is urged against the glass ribbon moving at a speed of about 17 feet/minute (5.1 meters/minute).

Variations in glass ribbon thickness and eccentricity of the conveyor rolls, e.g., roll 202 pivot the carriage 56 in a clockwise and/or counterclockwise direction as viewed in FIG. 3. The scoring force of the spring 120 acting on the scoring head assembly remains constant because the scoring head assembly and carriage are simultaneously displaced the same distance in the same direction as was previously discussed.

As can be appreciated, the preceding example is presented for illustration purposes and is not limited to the invention.

We claim:

1. A method of scoring a sheet of refractory material, comprising the steps of:
    advancing the sheet along a predetermined path under force adjusting means and scoring means;
    biasing the force adjusting means under a first predetermined force in a predetermined direction to bias the scoring means against the sheet under a second predetermined force to score the sheet; while
    pivoting the force adjusting means and scoring means about a common axis as the sheet moves thereunder to maintain a substantially constant biasing force on the scoring means as the sheet displaces or permits displacement of the scoring means and load adjusting means toward and away from the predetermined path.

2. The method as set forth in claim 1 wherein the second predetermined force is less than or equal to the first predetermined force.

3. The method as set forth in claim 2 wherein said biasing step includes the steps of:
    biasing the force adjusting means in the predetermined direction against the sheet;
    urging the scoring means against the second predetermined force away from the sheet; and discontinuing the practice of said urging step to bias the scoring means under the second predetermined force against the sheet to score the sheet.

4. The method as set forth in claim 3 further including the step of:

selectively practicing said urging and discontinuing steps to selectively score the sheet.

5. The method as set forth in claim 4 wherein the refractory material is a glass sheet.

6. The method as set forth in claim 4 wherein the refractory material is a glass ribbon.

* * * * *